UNITED STATES PATENT OFFICE.

GEORG TOBIAS, OF BERLIN, GERMANY.

PROCESS OF MAKING PYROCATECHIN.

SPECIFICATION forming part of Letters Patent No. 607,494, dated July 19, 1898.

Application filed December 28, 1897. Serial No. 664,105. (No specimens.) Patented in Germany May 26, 1894, Nos. 81,209 and 81,210; in France December 31, 1894, No. 244,052; in England January 2, 1895, No. 154, and in Austria September 6, 1895, No. 45/3,108.

*To all whom it may concern:*

Be it known that I, GEORG TOBIAS, a subject of the King of Prussia, German Emperor, residing in Berlin, S. W., 12 Waterloo Ufer, Germany, have invented certain new and useful Improvements in the Manufacture of Salts of Pyrocatechindisulfo - Acid and of Pyrocatechin Therefrom, of which the following is a specification, and for which patents have been granted as follows: in Germany, Nos. 81,209 and 81,210, dated May 26, 1894; in France, No. 244,052, dated December 31, 1894; in England, No. 154, dated January 2, 1895, and in Austria, No. 45/3,108, dated September 6, 1895.

My invention relates to the manufacture of salts of pyrocatechindisulfo-acid and of pyrocatechin therefrom.

The method which is simplest and there20 fore most frequently used in the industry for the introduction of a new phenol group—the melting of the corresponding sulfo-acid with an alkali—gives, when applied to phenol-orthosulfo-acid, a very small yield of pyro25 catechin by reason of the high temperature required for the transformation. (P. Degener, *Journ. für Prakt. Chemie*, 20, page 300.) An incomparably greater yield of pyrocatechin-monosulfo-acid is obtained from phenoldi30 sulfo-acid, but only when melting with the more expensive caustic potash at about 300° centigrade, while the employment of caustic soda at 300° to 310° centigrade gives a considerably smaller yield and a much more im35 pure product. (Barth and Schmidt, *Berichte der Deutschen Chemischen Gesellschaft*, 12, 1,260.)

I have found that phenoltrisulfo-acid, which may be easily obtained by the action of a suf40 ficient quantity of fuming sulfuric acid upon phenol, with cooling and ensuing heating at 100° to 110° centigrade for some time, gives, when melted with caustic potash at about 220° centigrade and also with caustic soda even at 240° to 260° centigrade, a good yield of pyrocatechindisulfo-acid. This disulfo-acid, like the disulfo-acid obtained by Cousin (*Compt. Rend.*, 117, page 113) by sulfurating pyrocatechin, is characterized by its somewhat sparingly soluble barium salt. The sodium and potassium salts of the disulfo-acid are easily soluble in water. The acid itself was obtained in the evaporation of its aqueous solution, produced by decomposing the barium salt with an equivalent quantity of dilute sulfuric acid, as a syrupy mass which does not crystallize. Its neutral and weak acid solution is colored intensely bluish green by ferric chlorids. This color, as in the case of monosulfo-acid, in consequence of the addition of sodium carbonate, changes through blue and violet to red.

A further essential part of my invention consists in the mode of splitting off perfectly pyrocatechin from the pyrocatechindisulfo-acid thus produced. It takes place by heating the aqueous solution of this acid for several hours to about 160° centigrade in an autoclave provided with a lining capable of withstanding the action of acid. If it is desired to obviate the production of pyrocatechindisulfo-acid and to subject its salts directly to hydrolysis, it is sufficient and expedient, while completely dispensing with the strong mineral acids—such as hydrochloric acid, sulfuric acid, phosphoric acid—large quantities of which have heretofore generally been used in similar cases, to heat the concentrated aqueous solution of the salts of the pyrocatechindisulfo-acid in autoclaves for a comparatively long time to about 200° to 220° centigrade. A slight addition of acid is here not injurious, but, as before stated, is completely dispensed with. In the pressure of considerable quantities of the before-mentioned strong acids, especially of sulfuric acid, the hydrolysis of the said salts will indeed take place and is to be carried out at a somewhat lower temperature; but no advantage is gained at all, either as regards the quality or the yield of the resulting pyrocatechin, by this method of working as compared with the method first described.

The mode of carrying my said invention into practice may be explained by the following example:

The basis sodium phenoltrisulfo salt to be employed is obtained by saturating the dilute crude phenoltrisulfo-acid with lime, precipitating the filtrate with an equivalent quantity of sodium carbonate, filtering, evaporating, and drying at 100° centigrade. Ten parts of this previously-ground salt are gradually introduced into fifteen to seventeen parts of caustic soda, which is melted with ten to fifteen per cent. of water in a cast-iron vessel provided with a stirrer and has reached a temperature of about 230° centigrade, which during the introduction of the salt is increased to 250° to 260° centigrade. After the introduction of the salt the fluid melt is maintained for some time at the same temperature. The cooled melt is dissolved in about twice its weight of water, and the solution is caused to pass slowly into a suitable quantity of forty to fifty per cent. sulfuric acid necessary for the neutralization and for the expulsion of the sulfurous acid, and then the main quantity of the sodium sulfate is with proper cooling crystallized out while stirring, the liquor being then drawn or thrown off as completely as possible, then washing with small quantities of cold water until the deep color of the liquor caused by some dissolved iron has become quite weak in the washing-water. The first filtrate is evaporated a little for as complete a removal as possible of the sodium sulfate, preferably cooled with ice, and the sulfate separated is washed out like the first main quantity. The washing-water serves for dissolving the next melt. The ultimate liquor thus obtained being substantially a concentrated solution of sodium pyrocatechindisulfo salt may either be subjected directly to hydrolysis or I obtain therefrom after further evaporation during the cooling the sodium salt in a solid crystalline form. For obtaining the barium salt this ultimate liquor is again diluted a little, and by fractionated addition of barium chlorid to the hot solution the sulfuric acid present as sodium sulfate is removed, whereupon the barium pyrocatechindisulfo salt is precipitated in the crystalline form.

Instead of using sulfuric acid I may treat the solution of the melt with carbonic acid or with washed products of combustion, preferably the waste gases resulting from the burning of lime, and thus recover, during the strong cooling of the solution, a great part of the caustic soda used in excess in the form of crystallized sodium carbonate which may be washed out in the same manner as the sodium sulfate; or the sufficiently-reduced melt is digested with only so much water that, say, a forty-per-cent. soda liquor is produced. Then the tetrasodium salt of the pyrocatechindisulfo-acid, together with sodium sulfite free from water, remains in the granular crystalline state undissolved, and by decantation, filtration, and pressing, preferably while heating, by reason of the greater fluidity of the liquor, a large portion of the caustic soda used may be recovered in the form of a concentrated liquor.

In lieu of caustic soda use may be made, as hereinbefore stated, of caustic potash at a lower melting temperature. Instead of in an open vessel the melt may be treated in closed apparatus provided with stirrers at a pressure corresponding to the quantity of water contained in the alkali and the melting temperature. Moreover, the quantitative proportions and temperatures stated in the example given may be varied within certain limits in the melting process.

For the production of pyrocatechin the ultimate liquor obtained as set forth in the before-mentioned example is heated in an autoclave, provided with a lining capable of withstanding the action of acid, for from ten to fifteen hours to between 200° and 220° centigrade. If in the case of the purer sodium pyrocatechindisulfo-salt isolated by crystallizing out the concentration of the solution to be subjected to hydrolysis is such that after the splitting a bisulfate solution saturated at the ordinary temperature is produced, the largest part of the pyrocatechin formed will crystallize out after the cooling, this pyrocatechin being sparingly soluble in a concentrated bisulfate solution in the cold state. The part dissolved in one or the other case is withdrawn by ether in the well-known manner, and after distilling the latter is obtained in a solid crystalline form. The small quantity of phenol which may still be contained therein can be easily removed by separating the small portion of the product distilling below 240° and not congealing at once or by once crystallizing the product distilled without fraction from two parts of benzol.

I claim as my invention and desire to secure by Letters Patent—

1. The process of making salts of the pyrocatechindisulfo-acid, by heating salts of the phenoltrisulfo-acid with caustic alkali to temperatures above 200° centigrade.

2. The process of making pyrocatechin by heating salts of the phenoltrisulfo-acid with caustic alkali to temperatures above 200° centigrade and then heating the alkaline salt of the pyrocatechindisulfo-acid thus obtained with water in closed vessels to temperatures above 140° centigrade.

3. The process of making pyrocatechin by heating pyrocatechindisulfo-acid, derived from its alkaline salts, with water in closed vessels to temperatures above 140° centigrade.

In testimony whereof I have signed my name to this specification in the presence of two subscribing witnesses.

GEORG TOBIAS.

Witnesses:
 AUGUST MÜHLE,
 WLADIMIR ZIOLECKI.